United States Patent
Yamamoto et al.

(10) Patent No.: US 6,928,811 B2
(45) Date of Patent: Aug. 16, 2005

(54) FLUID COUPLING

(75) Inventors: Yasushi Yamamoto, Kanagawa (JP); Nobuyuki Iwao, Kanagawa (JP)

(73) Assignee: Isuzu Motors Incorporated, Tokyo (JP)

(*) Notice: Subject to any disclaimer, the term of this patent is extended or adjusted under 35 U.S.C. 154(b) by 0 days.

(21) Appl. No.: 10/681,096

(22) Filed: Oct. 9, 2003

(65) Prior Publication Data

US 2004/0074232 A1 Apr. 22, 2004

(30) Foreign Application Priority Data

Oct. 18, 2002 (JP) .................................. 2002-304300

(51) Int. Cl.[7] .............................................. F16D 33/02
(52) U.S. Cl. ........................................ 60/355; 60/352
(58) Field of Search ........................... 60/352, 354, 355

(56) References Cited

U.S. PATENT DOCUMENTS 3,003,318 A * 10/1961 Heyer

\* cited by examiner

Primary Examiner—Edward K. Look
Assistant Examiner—Michael Leslie
(74) Attorney, Agent, or Firm—James N. Dresser, Esq.

(57) ABSTRACT

A fluid coupling comprising a pump having a pump shell and a plurality of impellers arranged in the pump shell, a turbine having a turbine shell arranged to be opposed to the pump and a plurality of runners arranged in the turbine shell, and a baffle mechanism arranged in a fluid circulation passage formed by the pump shell and the turbine shell, wherein the baffle mechanism comprises a first baffle plate having a plurality of first openings, a second baffle plate that has a plurality of second openings and is disposed in such a manner as to overlap with the first baffle plate and as to be allowed to rotate relative thereto, and a centrifugal operation means for turning the second baffle plate relative to the first baffle plate in response to the rotational speed of the first baffle plate.

1 Claim, 10 Drawing Sheets

FLUID COUPLING

FIELD OF THE INVENTION

The present invention relates to an improvement on a fluid coupling for transmitting a rotational torque of a prime mover.

DESCRIPTION OF THE RELATED ART

A fluid coupling has heretofore been used as a power transmission coupling for ships, industrial machinery and automobiles. The fluid coupling comprises a pump having an annular pump shell and a plurality of impellers radially arranged in the pump shell, and a turbine that has an annular turbine shell and a plurality of runners radially arranged in the turbine shell and is disposed opposite to the pump, and the pump and the turbine are filled with an operation fluid. In the thus constituted fluid coupling, the pump is coupled to a crank shaft (an input shaft as the fluid coupling) of a prime mover that may be, for example, a diesel engine, and the turbine is mounted on the output shaft arranged on same axis line as the input shaft.

Further, there is also used a fluid coupling in which the pump shell and the turbine shell are provided with annular core rings for guiding the operation fluid.

FIG. 11 is a diagram illustrating characteristics of a general fluid coupling, in which the abscissa represents a speed ratio (e) of the pump and the turbine and the ordinate represents a coefficient ($\tau$) of input capacity of the fluid coupling. As will be obvious from FIG. 11, the coefficient ($\tau$) of input capacity of the fluid coupling becomes a maximum in a state where the speed ratio (e) of the pump and the turbine is zero (0), i.e., in a state where the pump rotates but the turbine is at rest. When a drive device of the vehicle is furnished with the fluid coupling having the above characteristics, a drag torque is inevitably produced in a state where the vehicle is at rest, the engine is in operation and a speed change gear of a transmission is engaged, i.e., in a state where the input shaft is rotated but the output shaft is at a halt. The drag torque generally stands for a transmission torque in a state where the engine is operated at an idling rotational speed (e.g., 500 rpm). When the drag torque is large, the engine loses stability to a conspicuous degree during the idling operation and, besides, this unstable rotation becomes a cause of generating abnormal vibration in the drive system. Besides, a large drag torque is detrimental to the fuel efficiency during the idling operation.

As a countermeasure to reduce the drag torque, there has been known a technology for arranging a baffle plate between the pump and the turbine.

The countermeasure for reducing the drag torque by arranging the baffle plate will now be described with reference to FIGS. 12 and 13. The fluid coupling shown in FIG. 12 is the one in which an annular baffle plate BP mounted on an output shaft OS is disposed between the pump P and the turbine T. On the other hand, the fluid coupling shown in FIG. 13 is the one in which an annular baffle plate BP is disposed along the outer peripheral portion of the pump P.

The fluid couplings shown in FIGS. 12 and 13 employ a fixed baffle plate and have effect to change the characteristics of coefficient ($\tau$) of input capacity for the speed ratio (e) of the pump and the turbine, but is not capable of changing the $\tau$-characteristics for the input rotational speed. That is, if $\tau$ (e=0) is lowered to cope with the drag torque, the drag torque during the idling operation becomes lower than that of the case where no baffle plate is provided. In this case, however, the transmission torque, too, becomes small at the time of start, and the vehicle cannot start moving unless the engine rotational speed is considerably increased thereby causing the fuel efficiency to be deteriorated. On the other hand, if $\tau$ (e=0) is increased to increase the transmission torque at the time of start, the drag torque at the time of idling is also increased thereby causing the fuel efficiency to be deteriorated at the time of idling, though a large start torque is obtained. As described above, in the fluid coupling using the fixed baffle plate there exists a trade-off relationship between the drag torque during the idling and the fuel efficiency, which cannot be solved.

Further, as a countermeasure for reducing the drag torque, there is disclosed in JP-A 2001-50309 a fluid coupling mounting an annular baffle plate on the inner periphery or the outer periphery of a core ring of the pump shell or of the turbine shell.

When the drive device of a vehicle is furnished with a fluid coupling, it is desired that the characteristics are such that a large effective baffle area is obtained by the baffle plate until a predetermined input rotational speed (idling rotational speed) is attained in order to reduce the drag torque and that, when the predetermined rotational speed is exceeded, the effective baffle area of the baffle plate decreases to obtain a transmission torque corresponding to the rotational speed of the engine. According to the fluid coupling disclosed in the above JP-A 2001-50309, however, it is not possible to change the effective baffle area of the baffle plate in response to the rotational speed.

SUMMARY OF THE INVENTION

It is an object of the present invention to provide a fluid coupling equipped with a baffle mechanism capable of changing the effective baffle area of the baffle plate in response to the rotational speed.

In order to achieve the above object according to the present invention, there is provided a fluid coupling comprising:

a pump having a pump shell and a plurality of impellers arranged in the pump shell;

a turbine having a turbine shell arranged to be opposed to the pump and a plurality of runners arranged in the turbine shell; and a baffle mechanism arranged in a fluid circulation passage formed by the pump shell and the turbine shell; wherein the baffle mechanism comprises a first annular baffle plate that has a plurality of first openings in the circumferential direction and is constituted integrally with the pump or with the turbine, a second annular baffle plate that has a plurality of second openings in the circumferential direction and is disposed in such a manner as to overlap with the first baffle plate and as to be allowed to rotate relative thereto, and a centrifugal operation means for turning the second baffle plate relative to the first baffle plate in response to the rotational speed of the first baffle plate; and the centrifugal operation means brings the second baffle plate relative to the first baffle plate to such a position that the amount of overlapping of the first openings and the second openings decreases when the rotational speed of the first baffle plate is low, and turns the second baffle plate relative to the first baffle plate so as to increase the amount of overlapping of the first openings and the second openings when the rotational speed of the first baffle plate increases.

The centrifugal operation means comprises first elongated holes and second elongated holes formed respectively in the first baffle plate and in the second baffle plate in the directions of diameters thereof, weight members disposed being inserted through the first elongated holes and the second elongated holes, and a resilient urging means for so urging the second baffle plate as to be turned in a predetermined direction relative to the first baffle plate, at least either one of the first elongated holes or the second elongated holes being tilted with respect to straight lines in the radial direction passing through the center thereof.

DETAILED DESCRIPTION OF THE PREFERRED EMBODIMENTS

Preferred embodiments of the fluid coupling constituted according to the present invention will be described in further detail with reference to the accompanying drawings.

Figure 1:
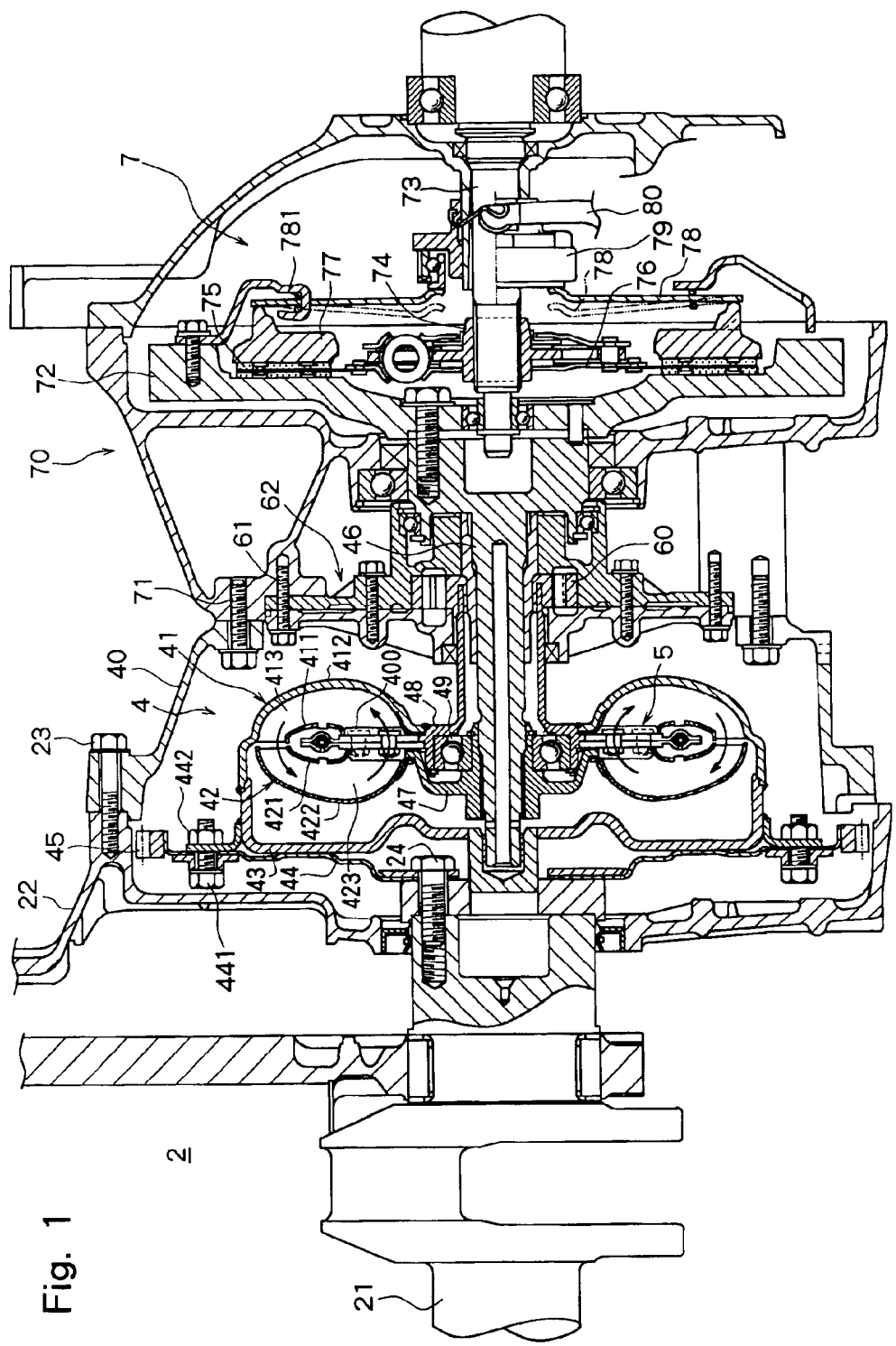
FIG. 1 is a sectional view illustrating a drive device furnished with a fluid coupling constituted according to an embodiment of the present invention.
Figure 2:
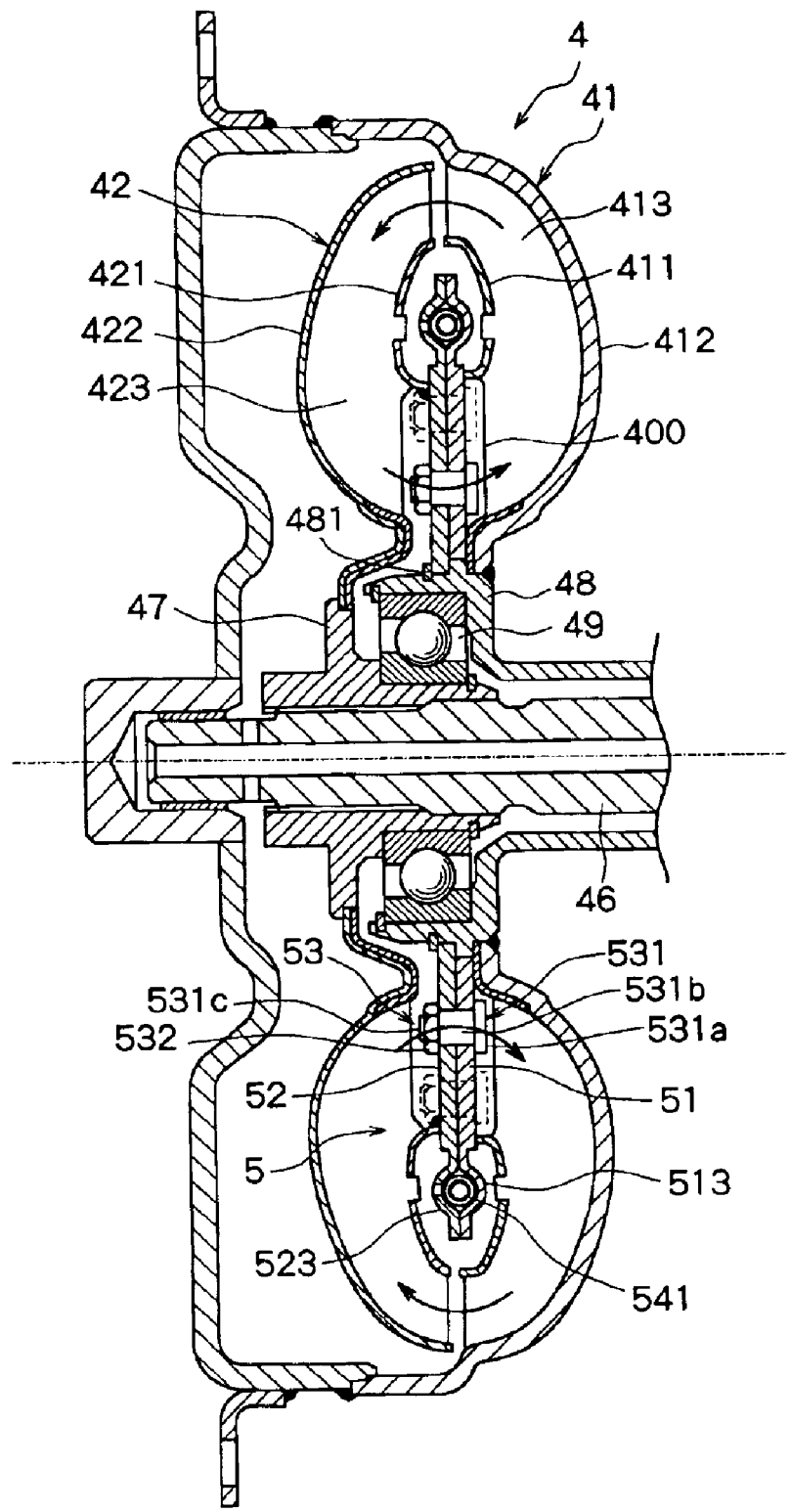
FIG. 2 is a sectional view of a fluid coupling constituted according to an embodiment of the present invention.

FIG. 1 illustrates an embodiment of a drive device in which a fluid coupling constituted according to the present invention is disposed between an automotive engine and a friction clutch. The drive device of the illustrated embodiment is constituted by an internal combustion engine 2 which is a prime mover, a fluid coupling 4 constituted according to the present invention and a friction clutch 7. The internal combustion engine 2 in the illustrated embodiment is a diesel engine, and the fluid coupling 4 on the side of the pump that will be described later is attached to an end of a crank shaft 21.

The fluid coupling 4 is disposed in a fluid coupling housing 40 that is attached by a fastening means such as bolts 23 or the like to a housing 22 mounted on a diesel engine 2. The fluid coupling 4 in the illustrated embodiment comprises a pump 41, a turbine 42 arranged facing the pump 41, and a casing 43 coupled to the pump 41.

The pump 41 that constitutes the fluid coupling 4 comprises a cup-like pump shell 412 having an annular core ring 411, and a plurality of impellers 413 radially arranged in the pump shell 412. The pump shell 412 is mounted on the casing 43 by a fixing means such as welding or the like. The casing 43 is mounted, by a fastening means such as bolts 441, nuts 442 or the like, on the outer peripheral portion of a drive plate 44 of which the inner peripheral portion is mounted on the crank shaft 21 by bolts 24. Thus, the pump shell 412 of the pump 41 is coupled to the crank shaft 21 via the casing 43 and the drive plate 44. Accordingly, the crank shaft 21 works as an input shaft of the fluid coupling 4. A ring gear 45 for starting is fitted onto the outer circumference of the drive plate 44 to come in mesh with a drive gear of a starter motor that is not shown.

The turbine 42 comprises a cup-like turbine shell 422 having an annular core ring 421 that faces the pump shell 412 of the pump 41, and a plurality of runners 423 radially arranged in the turbine shell 422. The turbine shell 421 is attached, by a fixing means such as welding or the like, to a turbine hub 47 spline-fitted to an output shaft 46 arranged on the same axis line as the crank shaft 21 as the input shaft.

The fluid coupling 4 in the embodiment of FIG. 1 is arranged in a fluid circulation passage 400 formed by the pump shell 412 and the turbine shell 422, and is equipped with a baffle mechanism 5 of which the effective baffle area changes in response to the rotational speed. The baffle mechanism 5 will be described later in detail.

The fluid coupling 4 of the illustrated embodiment has a hydraulic pump 60. The hydraulic pump 60 is disposed in a pump housing 62 attached, by a fixing means such as bolts 61 or the like, to a clutch housing 70 that will be described later of a friction clutch 7 mounted on the fluid coupling housing 40. The hydraulic pump 60 is so constituted as to be rotationally driven by a pump hub 48 attached to the pump shell 412 of the pump 41, and supplies an operation fluid to the pump 41 and to the turbine 42 through a fluid passage that is not shown. The pump hub 48 is rotatably supported by the turbine hub via a bearing 49.

The friction clutch 7 will be described next.

The friction clutch 7 is disposed in a clutch housing 70 mounted on the fluid coupling housing 40 by bolts 71. The friction clutch 7 in the illustrated embodiment comprises a clutch drive plate 72 mounted on the output shaft 46 of the fluid coupling 4, a transmission shaft 73 (in the illustrated embodiment, an input shaft of a transmission that is not shown) arranged on the same axis line as the output shaft 46, a driven plate 76 mounted on a clutch hub 74 spline-fitted to the transmission shaft 73 and mounting a clutch facing 75 on the outer peripheral portion thereof, a pressure plate 77 for pressing the driven plate 76 against the clutch drive plate 72, a diaphragm spring 78 for urging the pressure plate 77 toward the clutch drive plate 72, a release bearing 79 that engages with the inner end portion of the diaphragm spring 78 and operates the diaphragm spring 78 with an intermediate portion of thereof as a fulcrum 781, and a clutch release fork 80 for operating the release bearing 79 in the axial direction. When the thus constituted friction clutch is in the illustrated state, the pressure plate 77 is pushed toward the clutch drive plate 72 due to the spring force of the diaphragm spring 78. Accordingly, the clutch facing 75 mounted on the driven plate 76 is pressed against the clutch drive plate 72, and the power transmitted to the output shaft 46 of the fluid coupling 4 is transmitted to the transmission shaft 73 through the clutch drive plate 72 and the driven plate 76. To shut off the transmission of power, the hydraulic pressure is fed to a slave cylinder (not shown) to operate the clutch release fork 80, thereby moving the release bearing 79 toward the left in FIG. 1. Then, the diaphragm spring 78 is operated as indicated by a two-dot chain line in the drawing, to release the pressing force exerted on the pressure plate 77, whereby the transmission of power from the clutch drive plate 72 to the driven plate 76 is shut off.

The drive device equipped with the fluid coupling of the illustrated embodiment is constituted as described above. Described below is the operation thereof.

A driving force generated on the crank shaft 21 (input shaft) of the diesel engine 2 is transmitted to the casing 43 of the fluid coupling 4 via the drive plate 44. As the casing 43 and the pump shell 412 of the pump 41 are constituted integrally together, the pump 41 is rotated by the driving force. As the pump 41 rotates, the operation fluid in the pump 41 flows along the impellers 413 toward the outer periphery thereof due to the centrifugal force, and flows into the side of the turbine 42 as indicated by an arrow. The operation fluid that has flown into the side of the turbine 42, then, flows toward the inner peripheral side thereof and returns back into the pump 41 as indicated by an arrow. Thus, as the operation fluid in the pump 41 and the turbine 42 circulates through the pump 41 and the turbine 42, the drive torque on the side of the pump 41 is transmitted to the side of the turbine 42 through the operation fluid. The driving force transmitted to the side of the turbine 42, is transmitted to the output shaft 46 via the turbine shell 421 and the turbine hub 47, and is further transmitted to the transmission (not shown) through the friction clutch 7.

Next, the above baffle mechanism 5 according a first embodiment will be described with reference to FIGS. 2 to 7.

Figure 3:
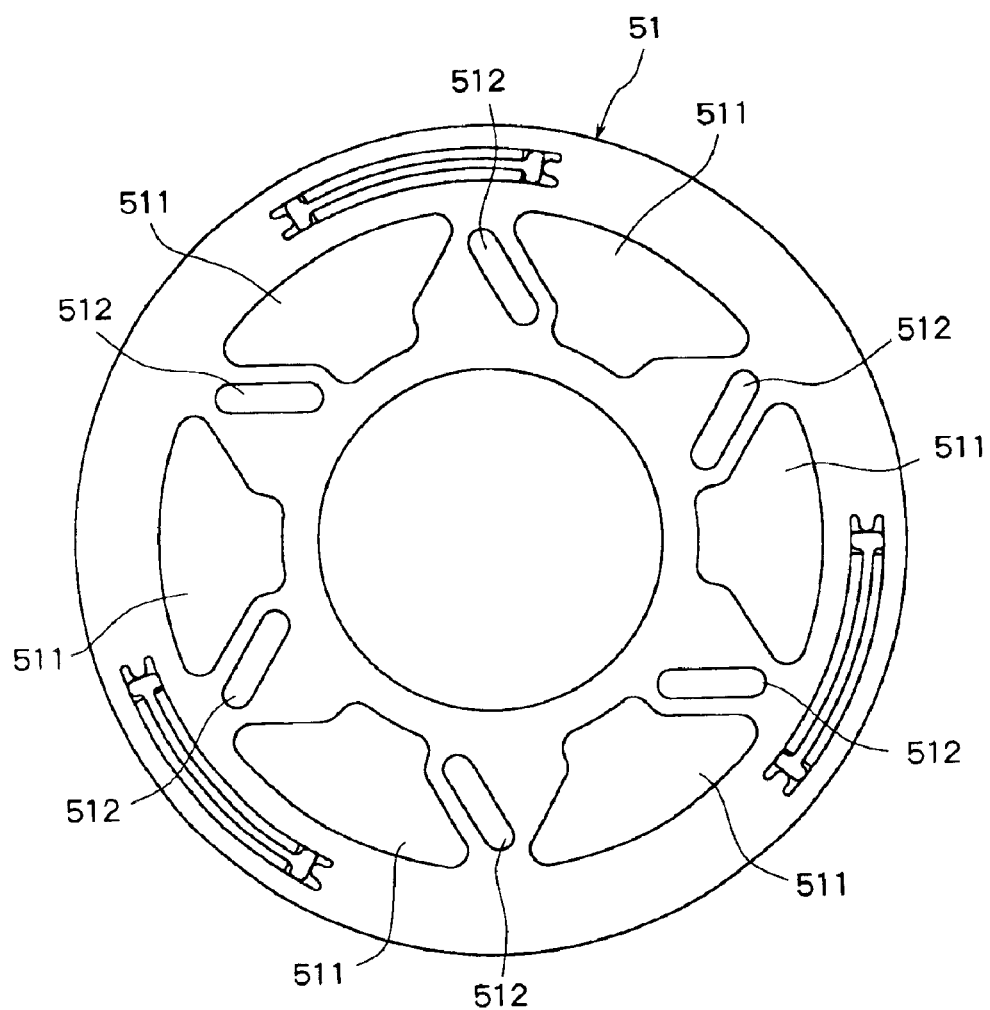
FIG. 3 is a front view of a first baffle plate constituting a first embodiment of the baffle mechanism with which the fluid coupling shown in FIG. 2 is furnished.

The baffle mechanism 5 according to the first embodiment has a first annular baffle plate 51 and a second annular baffle plate 52 which are arranged between the pump shell 412 and the turbine 422. Referring to FIG. 3, the first baffle plate 51 has a plurality (six in the illustrated embodiment) of first openings 511 formed in the circumferential direction and a plurality (six in the illustrated embodiment) of first elongated holes 512 which are formed, between the first openings 511, at a tilt of a predetermined angle with respect to the straight lines in the radial direction passing through the center. The thus formed first baffle plate 51 has its inner periphery fitted onto the pump hub 48 and has its outer periphery arranged in space formed by the core ring 411 of the pump shell 412 and the core ring 421 of the turbine shell 422. The first baffle plate 51 is secured to the pump shell 412 by a suitable fixing means, and is so constituted as to rotate integrally together with the pump 41.

Figure 4:
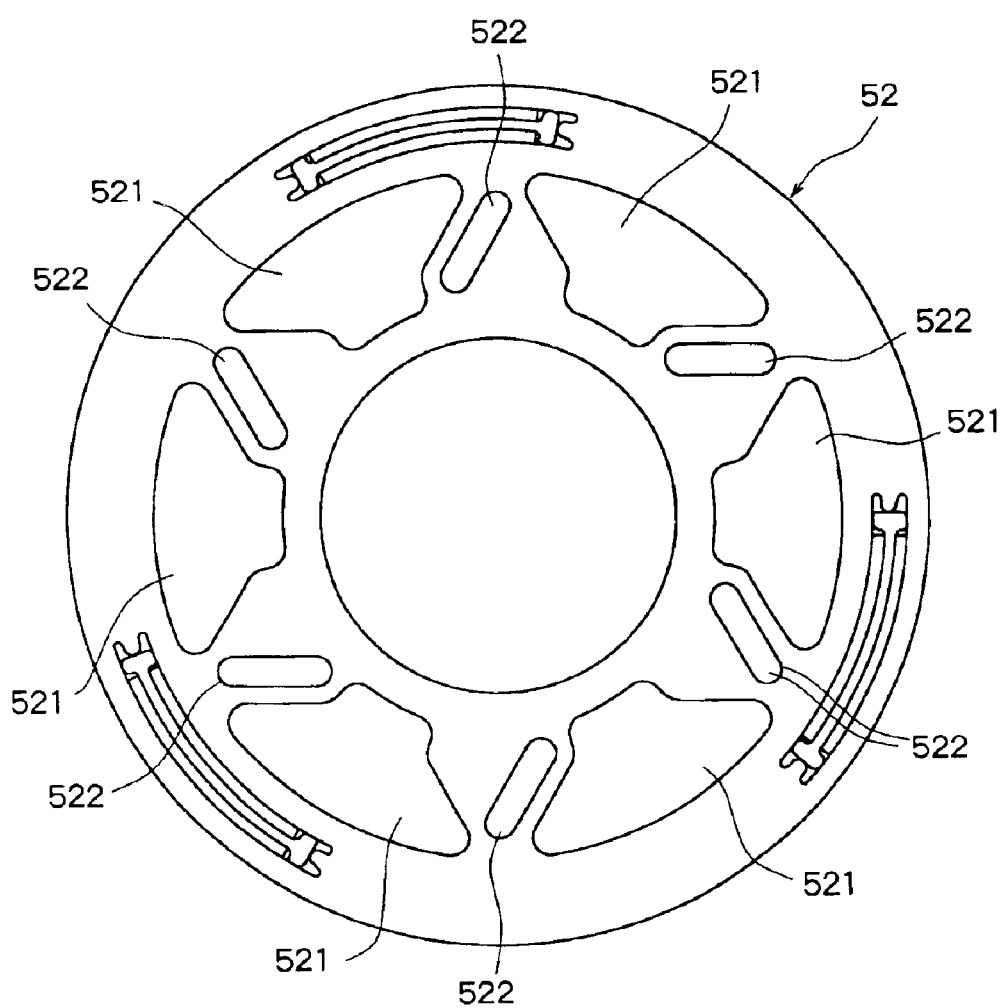
FIG. 4 is a front view of a second baffle plate constituting the baffle mechanism with which the fluid coupling shown in FIG. 2 is furnished.

Referring to FIG. 4, the second baffle plate 52 has a plurality (six in the illustrated embodiment) of second openings 521 formed in the circumferential direction like the above-mentioned first baffle plate 51 and a plurality (six in the illustrated embodiment) of second elongated holes 522 which are formed, between the second openings 521, at a tilt of a predetermined angle with respect to the straight lines in the radial direction passing through the center. The second elongated holes 522 are formed being tilted at a predetermined angle with respect to the straight lines in the radial directions passing through the center but in a direction opposite to the second elongated holes 512 formed in the first baffle plate 51. The thus formed second baffle plate 52 is disposed on the side of turbine (left side in FIG. 2) of the first baffle plate 51 in such a manner as to overlap with the first baffle plate 51 in the axial direction. The second baffle plate 52 has its inner periphery fitted onto the pump hub 48 and has its outer periphery arranged in space formed by the core ring 411 of the pump shell 412 and the core ring 421 of the turbine shell 422. The second baffle plate 52 thus arranged in such a manner as to overlap with the first baffle plate 51 in the axial direction, is constituted to be allowed to turn relative to the first baffle plate 51. The second baffle plate 52 is limited by a snap ring 481 mounted on the pump hub 48, from moving toward the left in the axial direction in FIG. 2.

Weight members 53 are disposed being inserted through the first elongated holes 512 formed in the first baffle plate 51 and the second elongated holes 522 formed in the second baffle plate 52, so as to move along both the elongated holes. Each weight member 53 is constituted by a stepped bolt 531 and a nut 532 that are made of a metal having a large specific gravity. The stepped bolt 531 comprises a head part 531a having a diameter larger than the widths of the first elongated holes 512 and the second elongated holes 522, a large-diameter portion 531b of a size slightly smaller than the widths of the first elongated holes 512 and the elongated holes 422, and a small-diameter portion 531c that has a size smaller than the large-diameter portion 531b and is threaded in the outer periphery thereof. The large-diameter portion 531b has a length in the axial direction, which is slightly longer than the sum of thicknesses of the first baffle plate 51 and the second baffle plate 52. The thus formed stepped bolt 531 is inserted through the first elongated hole 512 formed in the first baffle plate 51 and the second elongated hole 522 formed in the second baffle plate 52, and by screwing the nut 532 to the threaded part of the small-diameter portion 531c, the stepped bolt 531 is allowed to move along both the elongated holes. The weight members 53 constituted by the stepped bolts 531 and nuts 532 rotate together with the first baffle plate 51 that rotates integrally together with the pump 41, and the centrifugal force is produced by this rotation. In response to the magnitude of the centrifugal force, the weight members 53 move from the inner end positions toward the outer ends along the first elongated holes 512 formed in the first baffle plate 51 and along the second elongated holes 522 formed in the second baffle plate 52.

Figure 5:
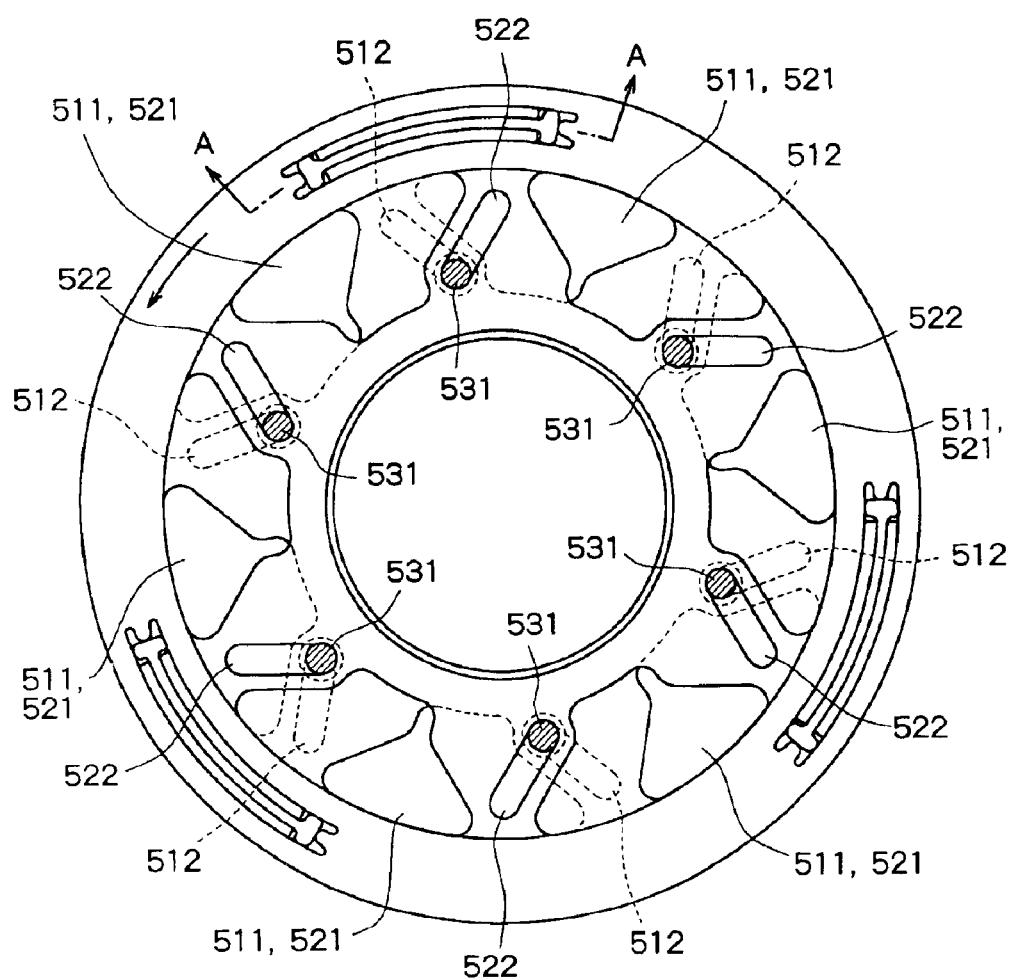
FIG. 5 is a view illustrating a first operation state of the baffle mechanism with which the fluid coupling shown in FIG. 2 is furnished.
Figure 7:
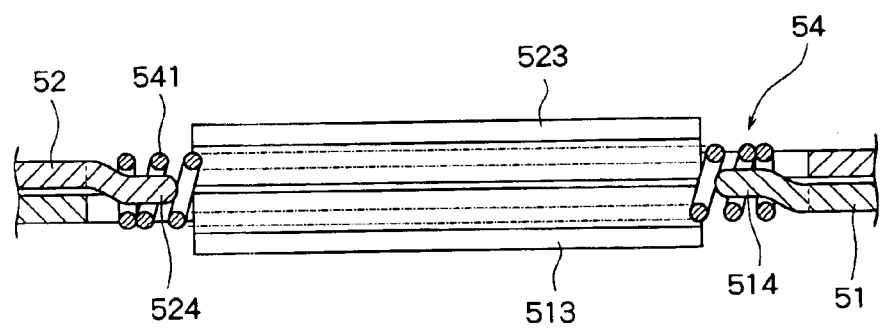
FIG. 7 is a sectional view along the line A—A in FIG. 5.

The baffle mechanism 5 in the first embodiment has a resilient urging means 54 for urging the second baffle plate 52 so as to turn in a predetermined direction relative to the first baffle plate 51. As shown in FIG. 7, the illustrated resilient urging means 54 are arranged in a number of three in the outer circumference of the first baffle plate 51 and the second baffle plate 52 at a predetermined interval in the circumferential direction. Each of the resilient urging means 54 is constituted by a compression coil spring 541 arranged between the first baffle plate 51 and the second baffle plate 52. The compression coil springs 541 are arranged in spring accommodating portions 513 and 523 of a semicircular shape in cross section, which is formed, by protruding in a carved shape, in the first baffle plate 51 and in the second baffle plate 52 at positions facing each other. One end of the compression coil spring 541 is fitted to an engaging protuberance 514 formed in the first baffle plate 51 and the other end of the compression coil spring 541 is fitted to an engaging protuberance 524 formed in the second baffle plate 52. Due to the spring forces of the compression coil springs 541, therefore, the second baffle plate 52 is urged to be turned in a direction indicated by an arrow in FIG. 5. As a result, the inner ends of the elongated holes 512 formed in the first baffle plate 51 are located at positions to be overlapped with the inner ends of the elongated holes 522 formed in the second baffle plate 52 as shown in FIG. 5 unless the rotational speed of the first baffle plate 51, i.e., of the pump 41 reaches a predetermined speed and a predetermined centrifugal force acts on the weight members 53. In this state, the amount of overlapping of the plurality of first openings 511 formed in the first baffle plate 51 and the plurality of second openings 521 formed in the second baffle plate 52 is set up so as to be the smallest, i.e., the greatest baffling area is set up so as to be attained by the baffle plates. In the state shown in FIG. 5, therefore, the baffle mechanism 5 has the smallest flow passage area for the operation fluid.

On the other hand, as the rotational speed of the first baffle plate 51, i.e., the pump 41 becomes greater than a predetermined speed and the centrifugal force greater than a predetermined value acts on the weight members 53, then, the weight members 53 move toward the outer ends along the first elongated holes 512 formed in the first baffle plate 51 against the spring forces of the compression coil springs 541. As a result, the second baffle plate 52 equipped with the second elongated holes 522 to which the weight members 53 are fitted, is turned in a direction indicated by an arrow in FIG. 6 against the spring forces of the compression coil springs 541. In the state shown in FIG. 6 where a centrifugal force greater than a predetermined value acts on the weight members 53, the amount of overlapping of the plurality of first openings 511 formed in the first baffle plate 51 and the plurality of second openings 521 formed in the second baffle plate 52 is set up so as to be the greatest (in the illustrated embodiment, the two openings are completely overlapped), i.e., the smallest baffling area is set up so as to be obtained by the baffle plates. In the state shown in FIG. 6, therefore, the baffle mechanism 5 has the greatest flow passage area for the operation fluid. As described above, the first elongated holes 512 and second elongated holes 522 formed in the first baffle plate 51 and in the second baffle plate 52, as well as the weight members 53 and the resilient urging means 54, are arranged between the first baffle plate 51 and the second baffle plate 52, and work as a centrifugal operation means for turning the second baffle plate 52 in response to the centrifugal force acting on the first baffle plate 51 and on the second baffle plate 52.

Figure 6:
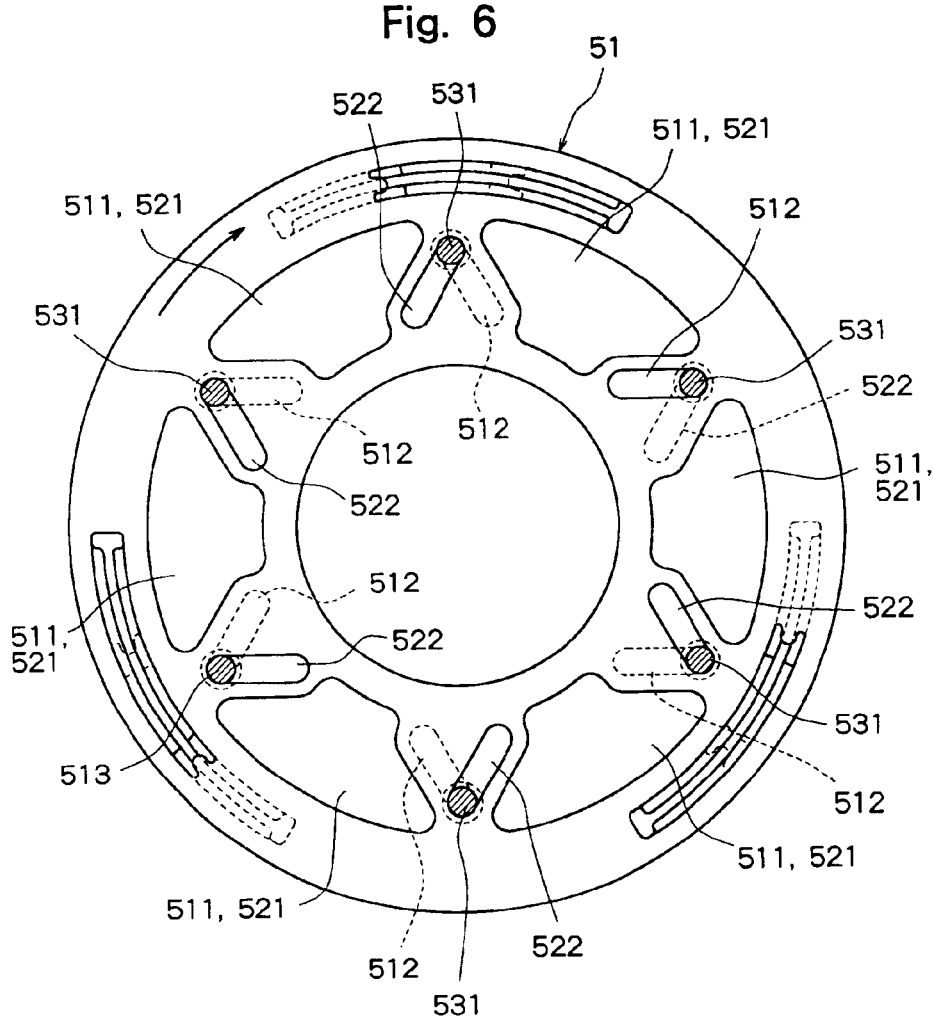
FIG. 6 is a view illustrating a second operation state of the baffle mechanism with which the fluid coupling shown in FIG. 2 is furnished.

According to the baffle mechanism 5 of the first embodiment as described above, the baffle area formed by the baffle plates is the greatest as shown in FIG. 5 until the rotational speed of the pump 41 reaches a predetermined value (e.g., 500 rpm which is an idling rotational speed of a diesel engine), and the flow passage area for the operation fluid in the baffle mechanism 5 becomes minimal. Therefore, an amount of the operation fluid that collides with the first baffle plate 51 and with the second baffle plate 52 is increased, whereby the flow rate of the operation fluid attenuates and the transmission torque decreases. Thus, it is made possible to lower the drag torque during the idling operation of the engine in a state where the speed ratio (e) of the pump and the turbine is zero (0), i.e., in a state where the pump rotates but the turbine is at a halt. As the rotational speed of the pump 41 or the first baffle plate 51 becomes greater than a predetermined value, on the other hand, an increased centrifugal force acts on the weight members 53. Therefore, the baffle area formed by the baffle plates decreases as shown in FIG. 6, and the flow passage area for the operation fluid in the baffle mechanism 5 increases.

Namely, the circulating operation fluid flows into the pump 41 without greatly baffled by the first baffle plate 51 and the second baffle plate 52 and hence, the transmission efficiency does not decrease at the time of the high-speed operation of the engine.

Figure 10:
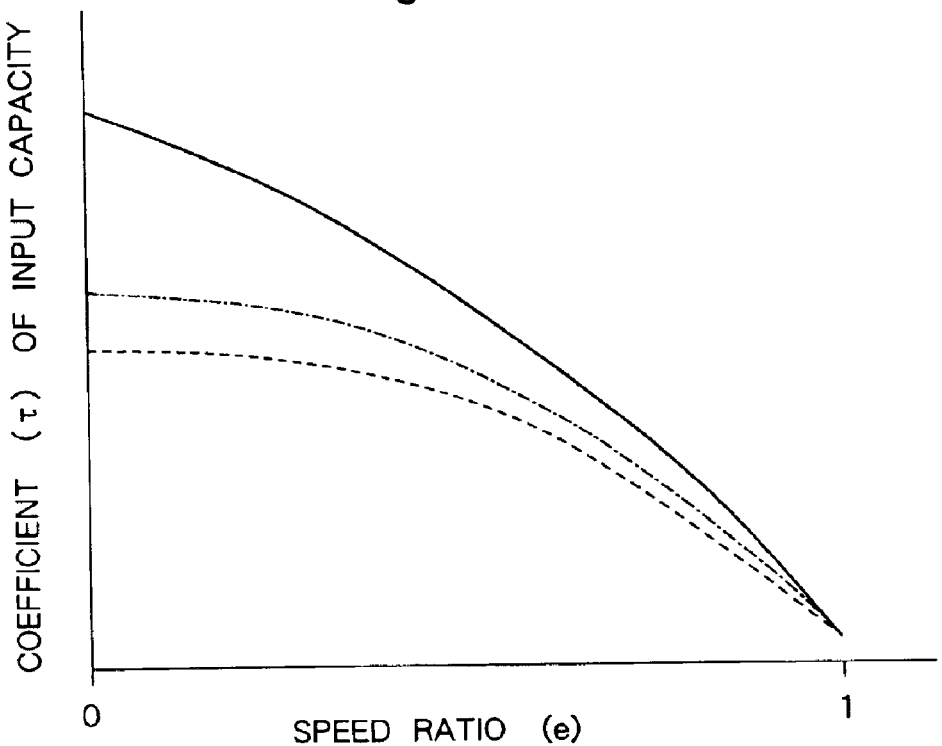
FIG. 10 is a diagram illustrating characteristics of the fluid coupling constituted according to the present invention.
Figure 11:
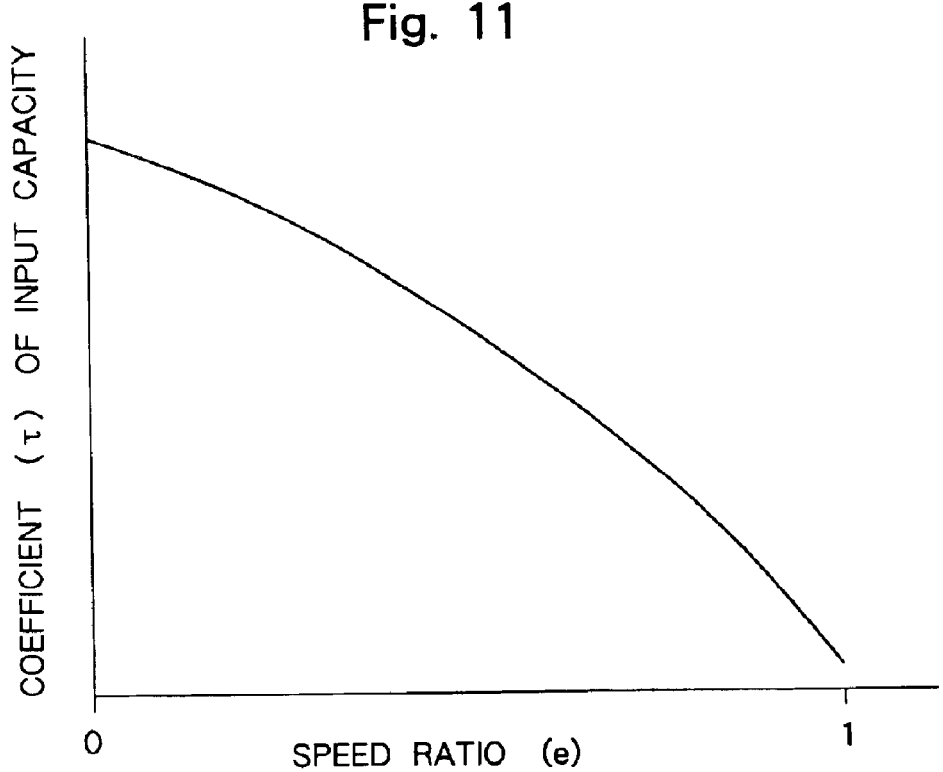
FIG. 11 is a diagram illustrating characteristics of a fluid coupling that has heretofore been used.
Figure 12:
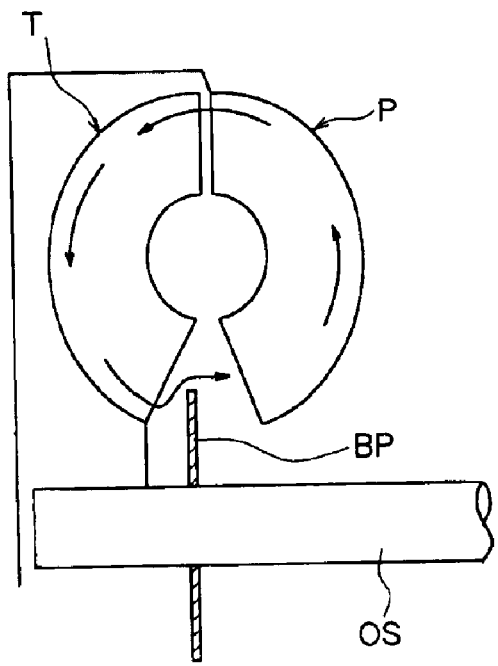
FIG. 12 is a diagram illustrating the flow of operation fluid in one example of a fluid coupling that has heretofore been used.
Figure 13:
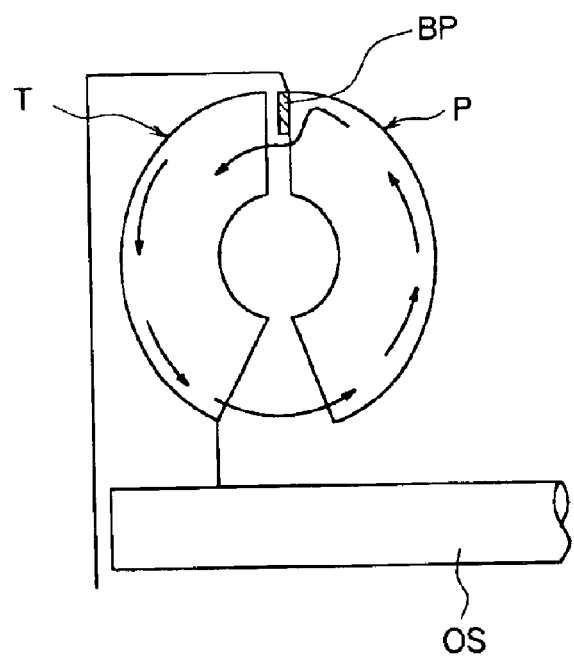
FIG. 13 is a diagram illustrating the flow of operation fluid in another example of a fluid coupling that has heretofore been used.

FIG. 10 is a diagram of characteristics of the fluid coupling furnished with the baffle mechanism 5, in which the abscissa represents the speed ratio (e) of the pump and the turbine, and the ordinate represents the coefficient ($\tau$) of input capacity of the fluid coupling. In FIG. 10, a broken line represents the characteristics during an idling rotational speed (e.g., 500 rpm) of the diesel engine, a dot-dash chain line represents the characteristics at an engine rotational speed a the time of start (e.g., 1000 rpm), and a solid line presents the characteristics at a maximum torque operation of the engine (e.g., 1500 rpm). That is, the fluid coupling furnished with the baffle mechanism 5 of the embodiment exhibits characteristics that meet the operating condition of the engine, thereby making it possible to lower the drag torque during the idling operation, to obtain a transmission torque that meets the driver's drive feeling and to smoothly start the vehicle.

Figure 8:
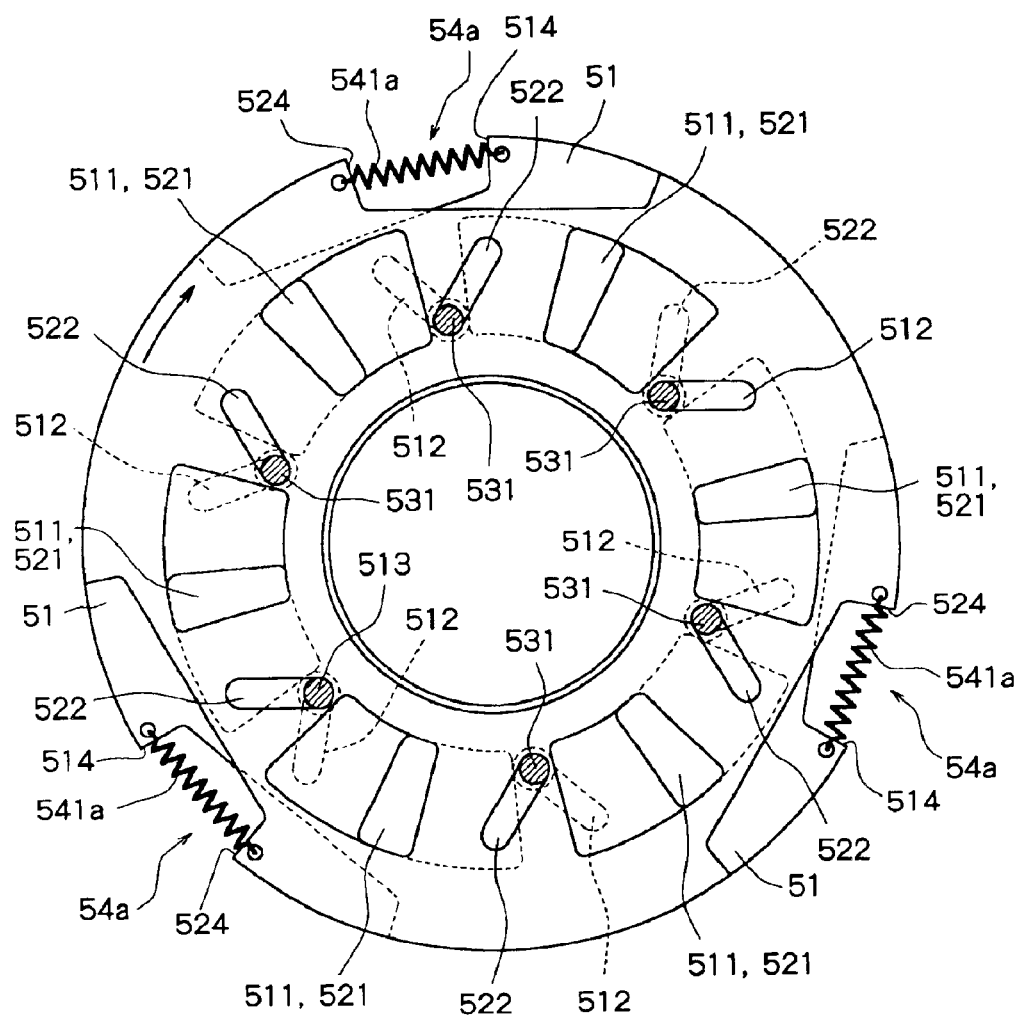
FIG. 8 is a view illustrating a first operation state of a second embodiment of the baffle mechanism with which is furnished the fluid coupling constituted according to the present invention.
Figure 9:
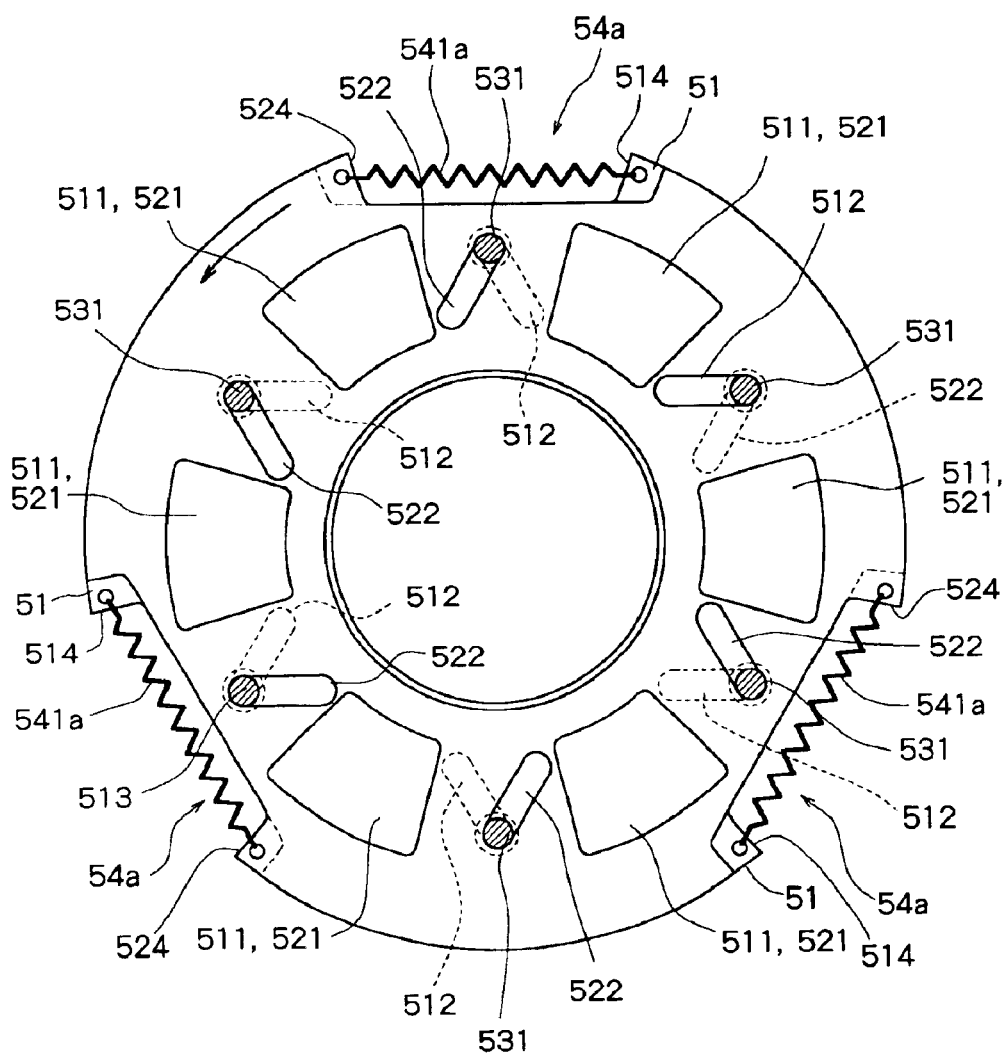
FIG. 9 is a view illustrating a second operation state of the second embodiment of the baffle mechanism with which is furnished the fluid coupling constituted according to the present invention.

Next, a second embodiment of the baffle mechanism will be described with reference to FIGS. 8 and 9. In the baffle mechanism 5a of the second embodiment, the same constituent members as those of the baffle mechanism 5 of the embodiment of FIGS. 1 to 7 are denoted by the same reference numerals but their detailed description is not repeated.

The baffle mechanism 5a according to the second embodiment uses helical extension springs 541a as resilient urging means 54a for turning the second baffle plate 52 in a predetermined direction relative to the first baffle plate 51. To arrange the helical extension springs 541a, three notches 514 and 524 are formed in the outer peripheral portions of the first baffle plate 51 and the second baffle plate 52. The helical extension springs 541a disposed in the respective three notches 514 and 524 are hooked, at the ends on one side, to the first baffle plate 51 and are hooked, at the ends on the other side, to the second baffle plate 52. Therefore, the second baffle plate 52 is urged by the spring forces of the helical extension springs 541a to turn in a direction indicated by an arrow in FIG. 8. As a result, the inner ends of the first elongated holes 512 formed in the first baffle plate 51 are located at positions to be overlapped with inner ends of the second elongated holes 522 formed in the second baffle plate 52 as shown in FIG. 8 unless the rotational speed of the first baffle plate 51, i.e., of the pump 41 reaches a predetermined speed and a predetermined centrifugal force acts on the weight members 53. In this state, the amount of overlapping of the plurality of first openings 511 formed in the first baffle plate 51 and the plurality of second openings 521 formed in the second baffle plate 52 is set up so as to be the smallest, i.e., the greatest baffling area is set up so as to be attained by the baffle plates. In the state shown in FIG. 8, therefore, the baffle mechanism 5a has the smallest flow passage area for the operation fluid.

On the other hand, as the rotational speed of the first baffle plate 51, i.e., the pump 41 becomes greater than a predetermined speed and the centrifugal force greater than a predetermined value acts on the weight members 53, then, the weight members 53 move toward the outer ends along the first elongated holes 512 formed in the first baffle plate 51 against the spring forces of the helical extension springs 541a. As a result, the second baffle plate 52 equipped with the second elongated holes 522 to which the weight members 53 are fitted, is turned in a direction indicated by an arrow in FIG. 9 against the spring forces of the helical extension springs 541a. In the state shown in FIG. 9 where a centrifugal force greater than a predetermined value acts on the weight members 53, the amount of overlapping of the plurality of first openings 511 formed in the first baffle plate 51 and the plurality of second openings 521 formed in the second baffle plate 52 is set up so as to be the greatest, i.e., the smallest baffling area is set up so as to be attained by the baffle plates. In the state shown in FIG. 9, therefore, the baffle mechanism 5a has the greatest flow passage area for the operation fluid. Therefore, the baffle mechanism 5a of the second embodiment, too, exhibits the same action and effect as the baffle mechanism 5 of the above-mentioned first embodiment.

In the above-mentioned first and second embodiments, the first baffle plates 51 that constitute the baffle mechanisms 5 and 5a are so constituted as to rotate integrally with the pump 41. However, the same effect is obtained even when the first baffle plate 51 is so constituted as to rotate integrally with the turbine 42. In the above first and second embodiments, further, the first elongated holes 512 and the second elongated holes 522 are formed in the first baffle plate 51 and in the second baffle plate 52 at a tilt of predetermined angles in the opposite directions relative to straight lines in the radial direction passing through the center, to constitute the centrifugal operation means that is arranged between the first baffle plate 51 and the second baffle plate 52 to turn the second baffle plate 52 in response to the centrifugal force acting on the first baffle plate 51 and on the second baffle plate 52. However, at least either the first elongated holes 512 or the second elongated holes 522 may be tilted relative to the straight lines in the radial direction passing through the center.

The fluid coupling according to the present invention is constituted as described above, and exhibits the action and effect as described below.

Namely, according to the present invention, a baffle mechanism arranged in a fluid circulation passage that is formed by the pump shell and the turbine shell comprises a first annular baffle plate that has a plurality of first openings in the circumferential direction and is constituted integrally with the pump or with the turbine, a second annular baffle plate that has a plurality of second openings in the circumferential direction and is disposed in such a manner as to overlap with the first baffle plate and as to be allowed to rotate relative thereto, and a centrifugal operation means for rotating the second baffle plate relative to the first baffle plate in response to the rotational speed of the first baffle plate, and the centrifugal operation means brings the second baffle plate relative to the first baffle plate to such a position that the amount of overlapping of the first openings and the second openings decreases when the rotational speed of the first baffle plate is low, and turns the second baffle plate relative to the first baffle plate so as to increase the amount of overlapping of the first openings and the second openings when the rotational speed of the first baffle plate increases. It is, therefore, made possible to effectively lower the drag torque without lowering the transmission torque at the time of high-speed operation.

We claim:

1. A fluid coupling, comprising:

a pump comprising a pump shell, and a plurality of impellers in said pump shell;

a turbine comprising a turbine shell, opposed to said pump, and a plurality of runners in said turbine shell, said turbine shell and said pump shell cooperating to define a fluid circulation passage; and a baffle mechanism in the fluid circulation passage; wherein:

said baffle mechanism comprises a first annular baffle plate that has a plurality of first openings in the circumferential direction thereof and that is constituted integrally with said pump or with said turbine, a second annular baffle plate that has a plurality of second openings in the circumferential direction thereof and that is disposed in such a manner as to overlap with said first baffle plate and as to be rotatable relative thereto, and a centrifugal operation device for rotating said second baffle plate relative to said first baffle plate in response to the rotational speed of said first baffle plate;

said centrifugal operation device brings said second baffle plate, relative to said first baffle plate, to such a position that the amount of overlapping of said the first openings and the second openings decreases when the rotational speed of said first baffle plate is low, and turns said second baffle plate relative to said first baffle plate so as to increase the amount of overlapping of the first openings and the second openings when the rotational speed of said first baffle plate increases; and said centrifugal operation device comprises a first set of elongated holes and a second set of elongated holes formed respectively in said first baffle elate and said second baffle plate in the directions of diameters thereof, weight members inserted through the first set of elongated holes and in the second set of elongated holes, and a resilient urging device for urging said second baffle plate to be turned in a predetermined direction relative to said first baffle plate, at least one set of the first set of elongated holes and the second set of elongated holes being tilted with respect to straight lines in the radial direction passing through the center thereof.

* * * * *